US008078729B2

(12) United States Patent
Kozat et al.

(10) Patent No.: US 8,078,729 B2
(45) Date of Patent: Dec. 13, 2011

(54) MEDIA STREAMING WITH ONLINE CACHING AND PEER-TO-PEER FORWARDING

(75) Inventors: Ulas C. Kozat, Santa Clara, CA (US); Mehmet U. Demircin, Dallas, TX (US); Oztan Harmanci, Mountain View, CA (US); Sandeep Kanumuri, Sunnyvale, CA (US)

(73) Assignee: NTT DoCoMo, Inc., Tokyo (JP)

( * ) Notice: Subject to any disclaimer, the term of this patent is extended or adjusted under 35 U.S.C. 154(b) by 310 days.

(21) Appl. No.: 12/194,157

(22) Filed: Aug. 19, 2008

(65) Prior Publication Data
US 2009/0055471 A1 Feb. 26, 2009

Related U.S. Application Data

(60) Provisional application No. 60/957,009, filed on Aug. 21, 2007.

(51) Int. Cl.
G06F 15/173 (2006.01)
G06F 17/30 (2006.01)
(52) U.S. Cl. ........................................ 709/226; 707/967
(58) Field of Classification Search .................. 709/226
See application file for complete search history.

(56) References Cited

U.S. PATENT DOCUMENTS

| 5,586,264 A | 12/1996 | Belknap et al. |
| 5,864,854 A | 1/1999 | Boyle |
| 6,970,937 B1 | 11/2005 | Huntington |
| 7,174,385 B2 * | 2/2007 | Li .................................. 709/231 |
| 7,716,660 B2 * | 5/2010 | Mackay ........................ 717/173 |

(Continued)

FOREIGN PATENT DOCUMENTS
EP 1643716 A 4/2006

OTHER PUBLICATIONS

PCT International Search Report for PCT Patent Application No. PCT/US2008/073646, Nov. 27, 2009, 6 pgs.

(Continued)

Primary Examiner — Jeffrey Pwu
Assistant Examiner — Guang Li
(74) Attorney, Agent, or Firm — Blakely, Sokoloff, Taylor & Zafman LLP

(57) ABSTRACT

A system, method and apparatus are disclosed herein for media streaming. In one embodiment, the system comprises one or more media servers to serve media content and a plurality of peers communicably coupled to one or more other peers of the plurality of peers and at least one of the one or more media servers to receive segments of media content, where at least one of peers allocates a set of resources for serving the segments of media content including cache memory to store the segments and media files and uplink bandwidth to send the segments of media content to the one or more peers to which the one peer is communicably coupled. The system also includes a first control server to track media content demand and the allocated resources of the plurality of peers to determine which peer should cache which segment of the media file and to return peer location information specifying the one or more peer locations from which each peer is to receive each segment of each media content requested. The control server is operable to send the location information to each peer. In one embodiment, the one control server is also operable to calculate a utility of each caching option and enforce it by sending triggers to the peers to initiate the caching at those peers.

33 Claims, 5 Drawing Sheets

U.S. PATENT DOCUMENTS

| | | | | |
|---|---|---|---|---|
| 7,852,786 | B2 * | 12/2010 | Wang et al. | 370/254 |
| 7,970,835 | B2 * | 6/2011 | St. Jacques | 709/206 |
| 2003/0118014 | A1 * | 6/2003 | Iyer et al. | 370/389 |
| 2003/0204602 | A1 * | 10/2003 | Hudson et al. | 709/228 |
| 2006/0190615 | A1 * | 8/2006 | Panwar et al. | 709/231 |
| 2007/0244983 | A1 * | 10/2007 | Berger | 709/217 |
| 2008/0028041 | A1 * | 1/2008 | Jung et al. | 709/218 |
| 2008/0133767 | A1 * | 6/2008 | Birrer et al. | 709/231 |
| 2008/0140853 | A1 * | 6/2008 | Harrison | 709/231 |

OTHER PUBLICATIONS

PCT Written Opinion of the International Searching Authority for PCT Patent Application No. PCT/US2008/073646, Nov. 27, 2009, 5 pgs.

PCT International Preliminary Report on Patentability for PCT Patent Application No. PCT/US2008/073646, Mar. 4, 2010, 6 pgs.

Pinho, L.B., et al., "GloVE: A Distributed Environment for Scalable Video-on-Demand Systems", International Journal of High Performance Computing Applications, 17(2): 147-161, Summer 2003.

Dana, C., et al., "BASS: BitTorrent Assisted Streaming System for Video-on-Demand," IEEE International Workshop on Multimedia Signal Processing (MMSP), Oct. 2005.

Li, Jin, "PeerStreaming: A Practical Receiver-Driven Peer-to-Peer Media Streaming System," Microsoft Research Technical Report (MSR-TR-2004-101), Sep. 2004.

Lalapria, K., et al., "Streaming Stored Playback Video Over a Peer-to-Peer network," IEEE Icc2004, Jun. 2004.

Ishikawa E., et al., "Cooperative Video Caching for Interactive and Scalable VoD Systems," Proceedings of the First International Conference on Networking-Part 2, pp. 776-785, 2001.

Annapureddy, S., et al., "Providing Video-on-Demand Using Peer-to-Peer Networks", Internet Protocol TeleVision (IPTV) Workshop, WWW '06, Edinburgh, Scotland, May 2006.

Do, T.T., et al., P2VoD: providing fault tolerant video-on-demand streaming in peer-to-peer environment:, IEEE International Conference on Communications, vol. 3, pp. 1467-1472, Jun. 2004.

Zhang, X., et al., "CoolStreaming/DONet: A Data-driven Overlay Network for Live Media Streaming", IEEE INFOCOM'05, Mar. 2005.

* cited by examiner

MEDIA STREAMING WITH ONLINE CACHING AND PEER-TO-PEER FORWARDING

PRIORITY

The present patent application claims priority to and incorporates by reference the corresponding provisional patent application Ser. No. 60/957,009, titled, "A Method and Apparatus for Improved Media Streaming with Online Caching and Peer-to-Peer Forwarding," filed on Aug. 21, 2007.

FIELD OF THE INVENTION

The present invention relates to the field of video streaming, content distribution, and communication networks; more particularly, the present invention relates to media streaming with on-line caching and peer-to-peer forwarding.

BACKGROUND OF THE INVENTION

Peer to peer content distribution and streaming is well-known and there are numerous system proposals and implementations in the literature and industry. One such system includes peers, where each peer stores and streams videos to the requesting client peers. Each video is encoded into multiple descriptions and each description is placed on a different node. When a serving peer disconnects, the system locates another peer who is storing the same description and has sufficient uplink bandwidth for the requesting client. This solution does not provide a cache or storage management policy.

A method for arranging nodes within a wide area network has been disclosed in which users relay broadcast content among each other. The conventionally-encoded media stream is segmented into small files and each file is uploaded to users who re-upload them repeatedly in a chain-letter style multiplier networks. The clients at the same time playback the files continuously through a conventional media player after some playback delay.

In another system, clients have a memory cache used for storing the downloaded media file. The clients are clustered together, depending on their arrival times, to join the same media stream from the server in a chained fashion. They fetch the missing initial segments of the media file from the cache of other clients in the chain. The specified system does not manage the resources proactively, but applies static rules of caching and serving.

A data buffer management tool has been disclosed in which a decision is made on what should remain in the mass storage and what should be retained in the buffer memory when serving multiple video ports. The tool makes use of the predictable nature of the video data stream in predicting future requirements for a given one of the data blocks to decide whether to retain it in the buffer or in the mass storage.

A cache lookup system to retrieve data in a client-server network has been proposed, where clients use the caches of other clients to retrieve the requested information. The system does not specify how the cache spaces should be optimized to reduce the server load. In another system referred to as BASS the BitTorrent is augmented by adding a media server into the system and forcing clients to download only the segments after their playback point. Clients can download both from the media server and use the BitTorrent peer-to-peer (P2P) connections simultaneously. The system combines the benefits of client-server and P2P architectures, but it does still follow a randomized caching strategy since it is based on BitTorrent system, where rarest segments in the neighborhood of a client are pushed forward to the client and tit for tat sharing policies are utilized.

Caches of peers have been treated as seeds of new multicast sessions to improve the server bandwidth utilization. Again the caching strategy here is static and not adaptive to the demand. It also requires chaining of nodes and patching missing information. Hence, the client caches are not optimized with respect to the demand.

An erasure coding method has been proposed to generate encoding blocks from the original media and instead deliver unique encoding blocks to each of the clients. Clients store as many encoding blocks as possible depending on their buffer sizes and serve the cached content to other peers. Again this method does not allow optimizing the cache for the demand heterogeneity across the video segments and its time-variability. Caching in the context of deciding where the new coming clients join into the distribution tree has been discussed. Also random pre-fetching of future data has been proposed, as well as caching the most recent data and the control is over the topology rather than the cached data. In another solution, the "supplier" of a segment counts, but the supply is not used in caching decisions. The supply count is used to decide whom to ask for which segment (e.g., one policy is to ask for the rarest segment in the system). The solution utilizes a gossiping based protocol to establish delivery.

SUMMARY OF THE INVENTION

A system, method and apparatus are disclosed herein for media streaming. In one embodiment, the system comprises one or more media servers to serve media content and a plurality of peers communicably coupled to one or more other peers of the plurality of peers and at least one of the one or more media servers to receive segments of media content, where at least one of peers allocates a set of resources for serving the segments of media content including cache memory to store the segments and media files and uplink bandwidth to send the segments of media content to the one or more peers to which the one peer is communicably coupled. The system also includes a first control server to track media content demand and the allocated resources of the plurality of peers to determine which peer should cache which segment of the media file and to return peer location information specifying the one or more peer locations from which each peer is to receive each segment of each media content requested. The control server is operable to send the location information to each peer. In one embodiment, the one control server is also operable to calculate a utility of each caching option and enforce it by sending triggers to the peers to initiate the caching at those peers.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
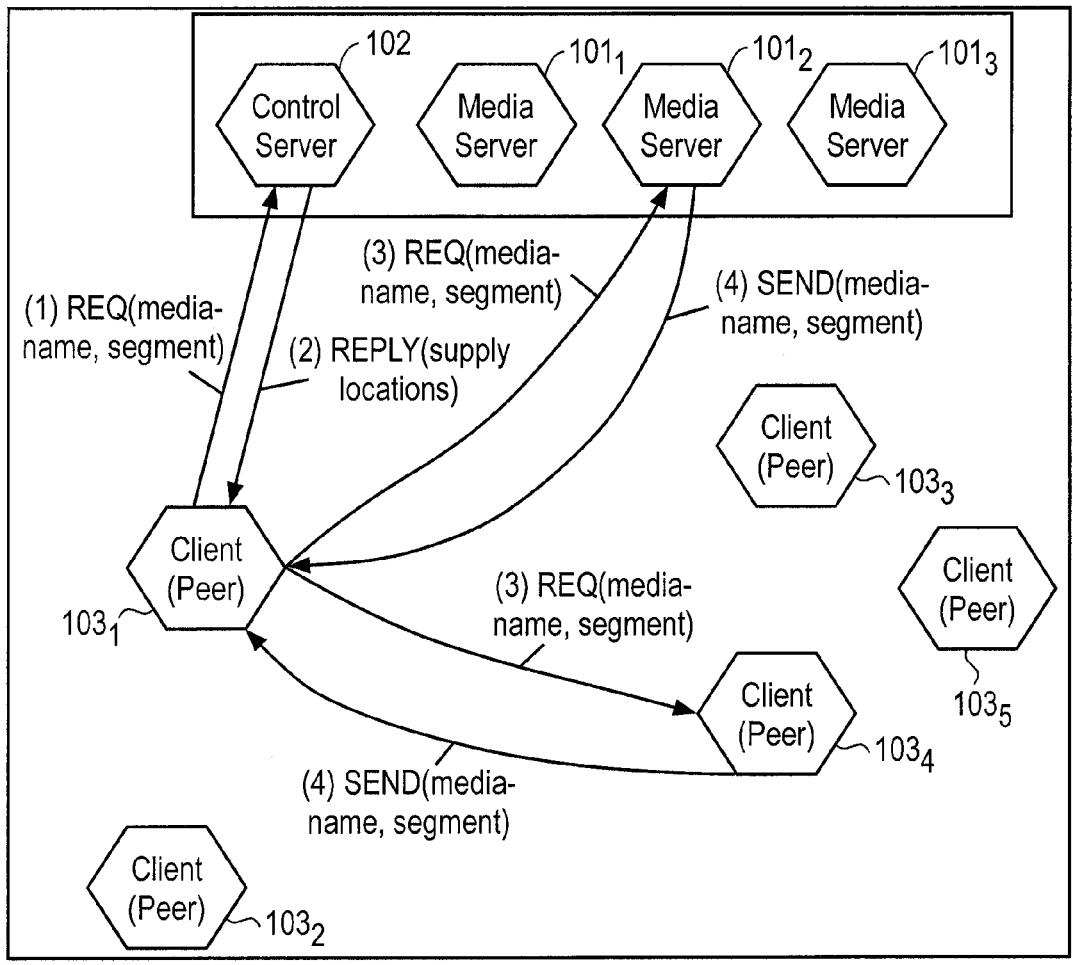
FIG. 1 is a block diagram of one embodiment of a system.

In one embodiment, a system includes one or more media servers to provide media streaming services to many peers (e.g., clients). Each peer dedicates (or relinquishes) some of its memory resources, computer processing unit (CPU) resources, bandwidth resources (downstream and/or upstream) to the system and these resources are used to serve media to other peers. The servers facilitate the distribution of a given media content by serving the requested portions, or segments, of the content either directly from themselves to the requesting client(s) or from one or more distinct peers to the requesting client(s). In one embodiment, clients issue their requests to the servers and servers in return provide a number of peer locations where the requested portions of the media are located. Servers have the control over the peer resources relinquished (dedicated) to the system. Servers use the memory resources of peers to store (e.g., cache) segments of the media and use the uplink bandwidth of these peers to serve the cached segments. In another embodiment, clients issue their requests to the servers and servers direct one or more peers or servers to serve the requesting client.

For a given media segment, the total uplink bandwidth summed across the peers who currently cache this segment defines a supply for peer-to-peer delivery of the segment. The total number of requests and the requested download rates for the same segment on the other hand determine the demand for the segment. Multiple techniques are disclosed that are utilized over the system to match the supply and demand for each segment by making on-line caching decisions.

In one embodiment, some of the nodes (referred to herein as control servers) keep track of the current supply, current demand, and predicted future demand of all segments of media files. This may be all media files or some subset of the media files (e.g., at least the popular media files). In one embodiment, the future demand predictions take into account the deterministic behavior under normal media streaming operation logic as well as the stochastic behavior due to random peer arrivals, departures, failures, etc.

In one embodiment, the caching decisions at each node are performed by the control servers with the aim of increasing, and potentially maximizing, the utility of the available cache space within a time-horizon given the supply and predicted demand in the given time-horizon for all the segments. The caching decisions are executed in different ways. In one embodiment, caching decisions can be in the form of pre-fetching some of the segments ahead of time to the peers to balance the future demand and to reduce the future server load. This requires allocating some server bandwidth to fetch currently under-represented media segments. In another embodiment, one or more servers do not perform any pre-fetching but a cache replacement strategy is used. Whenever a peer finishes downloading a segment it requested (for playback, for example), the server decides whether to keep the previously cached segments or to keep the currently downloaded segment. In another embodiment, the peer makes the decision. In one embodiment, the decision is made to improve the overall utility of the cache. The peer updates its cache according to the decision. Pre-fetching and cache replacement strategies can also be used together to further improve the performance.

Thus, the technologies disclosed herein differ in ways to optimize the system resources and in the mechanisms used to match the demand and supply. One embodiment of the invention takes into account the media streaming requirements and network/server/peer bandwidth and memory constraints as well as random events (e.g., nodes joining and leaving the system) to develop an effective way to pair peers and match supply and demand. In one embodiment, a cache trigger signaling accomplishes the cache optimization decisions. Both in-band (no extra bandwidth usage) and out-of-band (i.e., prefetching) caching methods may be used. These overall features make the techniques disclosed herein, unique and different than the other peer-to-peer streaming solutions.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A media streaming system comprises one or more media servers to serve media content to peers (e.g., client computer systems), multiple peers to receive segments of media content from and be communicably coupled to other peers and one or more of the media servers, and at least one control server. Each peer allocates a set of resources for serving the segments of media content, including cache memory to store the segments and media files and uplink bandwidth to send the segments of media content to other peers to which they are communicably coupled. The control server(s) track media content demand and the allocated resources of the peers to determine location information specifying the one or more peer locations from which each peer is to receive each segment of each item of media content requested and sends the location information to the peer.

In one embodiment, access to an item of media content (e.g., a video) is controlled by one control server in the system during the time the video is available for playback in the system. In one embodiment, each control server is operable to determine how media files are segmented and determine download rates and playback delays of each segment.

In one embodiment, each peer specifies locally available resources to at least one control server. In one embodiment, each peer has a cache memory limited in size to storing only one segment of media. In one embodiment, a control server causes a segment of media to be streamed to a peer after the peer joins the system. In response, the peer caches the segment into its cache memory. In another embodiment, each peer has a cache memory that can store multiple segments and the upload rate of the caching peer is shared by all the cached segments in a well-specified manner, e.g., each segment takes an equal rate allocation (e.g., where the upload rate is R and peer can cache 3 segments, then each segment is served at R/3; if a peer can cache 4 segments, then each segment is served at rate R/4).

In one embodiment, the control servers send triggers to peers to start caching process for one or more segments of media content. In one embodiment, peers receive a trigger from a control server to cache one or more segments of media content. In one embodiment, a peer pre-fetches these one or more segments, in response to the trigger, from the one or more media servers and one or more other peers. In one embodiment, the peer receives the one or more segments to be played immediately or in the future.

In one embodiment, a control server or a peer determines whether the peer continues to store the segment or overwrites the segment with a new segment being downloaded for playback. In one embodiment, determining whether to cache the new segment is based on a determined amount of reduction in load of at least one of the one or more media servers achieved over a period of time. In another embodiment, determining whether to cache the new segment is based on a prediction of future demand of the new segment and capability of peers and media servers to supply the new segment to other peers.

In one embodiment, a control server tracks supply and demand of each segment of media content by each peer. In one embodiment, a control server determines which peers are possible candidates to serve a requested segment using peer arrival rates and supply-demand analysis with respect to the peers and supply and demand of segments of media content with respect to the peers. In one embodiment, a control server determines this by attempting to maximize uplink bandwidth utilization at each peer by making desired segments of media content accessible at a particular time. In one embodiment, the media (e.g., video) is partitioned into contiguous segments and the control server computes an estimated future demand for each of the segments.

In one embodiment, a control server is operable to estimate supply and demand curves corresponding to each segment of media content at a future time and use each estimate to determine the location information. In one embodiment, the first control server generates the estimate using peer arrival and departure time statistics. In another embodiment, the control server generates the estimate using peer arrival and departure time statistics, information indicative of when a particular media segment is requested, node inter-arrival and inter-departure statistics (e.g. mean and standard deviation of inter-arrival and inter-departure times), information about round-trip-time communication (the round trip communication delay between the control server and each peer as well as the round trip delay between paired peers) and processing delays (the delay that occurs because each node has to parse the packets and execute certain functions to facilitate the streaming operation). In yet another embodiment, the control server generates the estimate using one or more of a group consisting of media playback rate, media download rates, and media segment sizes. These estimates are updated in regular or irregular intervals.

In one embodiment, a control server generates the estimate based on a utility measure computed for each media file and each segment of a media file from supply and demand curves corresponding to the supply and demand with respect to each segment. In one embodiment, the control server determines which segments to cache based on computed utility functions associated with each segment.

FIG. 1 is a block diagram of a media streaming system. Referring to FIG. 1, the system comprises a number of media servers $101_{1-3}$ that store and serve original media content (e.g., files); a control server 102 that monitors and maintains the system operations as well as perform resource management, control, allocation and optimization; and clients $103_{1-5}$ (also referred to herein as peers) that have limited local resources (e.g., memory space, bandwidth, CPU cycles, etc.). Although only one control server is shown in FIG. 1, there can be any number of control servers in the system. Similarly, while only three media servers are shown and only five clients are shown, there can be any number of them in the system.

Control server 102, media servers $101_{1-3}$ and/or clients $103_{1-5}$ can be physically separate or collocated nodes, with each node in the system typically interconnected via some communication link and/or computer network. Clients $103_{1-5}$ can themselves be the original generator (and hence a media server) of a media content and/or consumers of existing media content.

In one embodiment, clients dedicate some of their local resources to the media distribution system to the extent they are used in the distribution of media content among peers. The incentives provided to clients for such a dedication is not disclosed or subject of the current disclosure. In one embodiment, clients directly send their requests (e.g., REQ (media-name, segment)) for a particular segment of a media file to one of control server 102 which maintains a database (e.g., list) of clients in the system and the segments of media content that they are currently caching. Hence, they maintain a global view of the media content. In response, control server 102 searches from its database for the locations that can supply the requested segment of the media file at the desired rate. Control server 102 replies (e.g., REPLY(supply locations)) back to the requesting client 103 with the list of locations and their possible attributes such as, for example, available resources, distance, etc. When the requesting client (e.g., client $103_1$) receives the reply message from control server 102, client $103_1$ contacts the locations and if the locations satisfy the conditions of the request, they start streaming the requested segment to the client. In one embodiment, the list of locations includes one or more media servers 101 and one or more other client nodes 101. In the example in FIG. 1, client $103_1$ sends requests for segments from media server $101_2$ and client $103_4$. The list of locations may include solely client nodes or solely media servers or a combination of both. Although not depicted in FIG. 1, in one embodiment, control server 102 can directly send control messages to a set of locations which then start pushing the requested video segment to the requesting peer. In such a "push-based" operation mode, the requesting peer expects video payloads in response to its request to control server 102.

In one embodiment, the requesting client can support parallel streaming from many points, where each stream carries unique information. In one embodiment, the unique information feature can be satisfied by explicitly requesting non-overlapping portions of a given segment from different nodes. In another embodiment, the unique information feature is satisfied by unique encoding blocks generated from the original message blocks stored at each location. The encoding blocks can be generated using (but not limited to) fixed rate or rateless erasure codes such as, for example, Reed-Solomon, Tornado Codes, Raptor Codes, LT Codes, etc.

Figure 2:
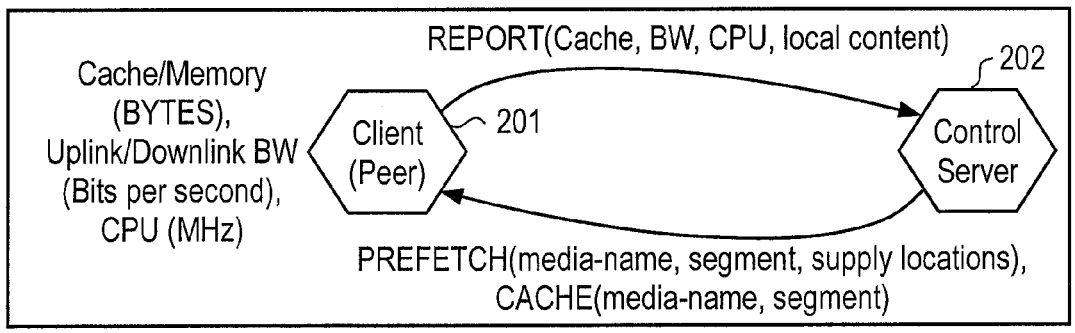
FIG. 2 illustrates one embodiment of a client in a system reporting its resources periodically to a control server and the manner in which the control server dictates the caching decisions.

In one embodiment, the media streaming system uses an explicit control signaling mechanism between control server 102 and clients $103_{1-5}$. FIG. 2 illustrates a client 201, which is one of many clients in the system, reporting their local resources periodically to a control server 202. Referring to FIG. 2, client 201 sends control server 202 a report with the size of its cache memory allocated to the system, its uplink/downlink bandwidth, its CPU cycles dedicated to the system and an indication of the local content stored in its cache. In one embodiment, clients also use report messages as "ALIVE" messages to confirm that they are available and can execute as supply and/or demand nodes. Control server 202 decides whether prefetching or different caching is needed at each client and signals the decision to the clients. In one embodiment, control server 202 signals client 201 to prefetch a media segment by specifying the segment by PREFETCH (media-name, segment, supply locations) and/or signals client 201 to cache a media segment by specifying the segment by CACHE(media-name, segment). Thus, in one embodiment, the control servers maintain a global state of clients and media servers in the system. In another embodiment, control servers may have a more limited view of the system and make local decisions in coordination with other control servers.

In one embodiment, control servers explicitly trigger caching decisions at the client nodes by issuing explicit control messages. In one embodiment, one control message requests clients to download (e.g., pre-fetch) some segments of a media file before the client actually requests them. In one embodiment, the segment to be pre-fetched might not be ever requested or demanded by a client. In another embodiment, another control message requests clients to cache a future segment that is not yet demanded by the client but predicted to be demanded by the client in the near future. When clients issue their orders sequentially from the first segment to the last (which is the case for video streaming applications), it is possible for a control server to anticipate when a client will issue a request to download a future segment. Hence, if the demand for any of the future segments is higher than the supply, the control server triggers the caching by sending an explicit control message. When a client receives the trigger, it continues its sequential download. When the segment indicated by the trigger is scheduled to be received according to the normal video streaming operation, the client starts caching that segment. In one embodiment, the clients contribute to the supply of a segment as soon as they start caching the segment. In another embodiment, clients contribute to the supply of a segment only after they fully cache the segment.

Figure 3:
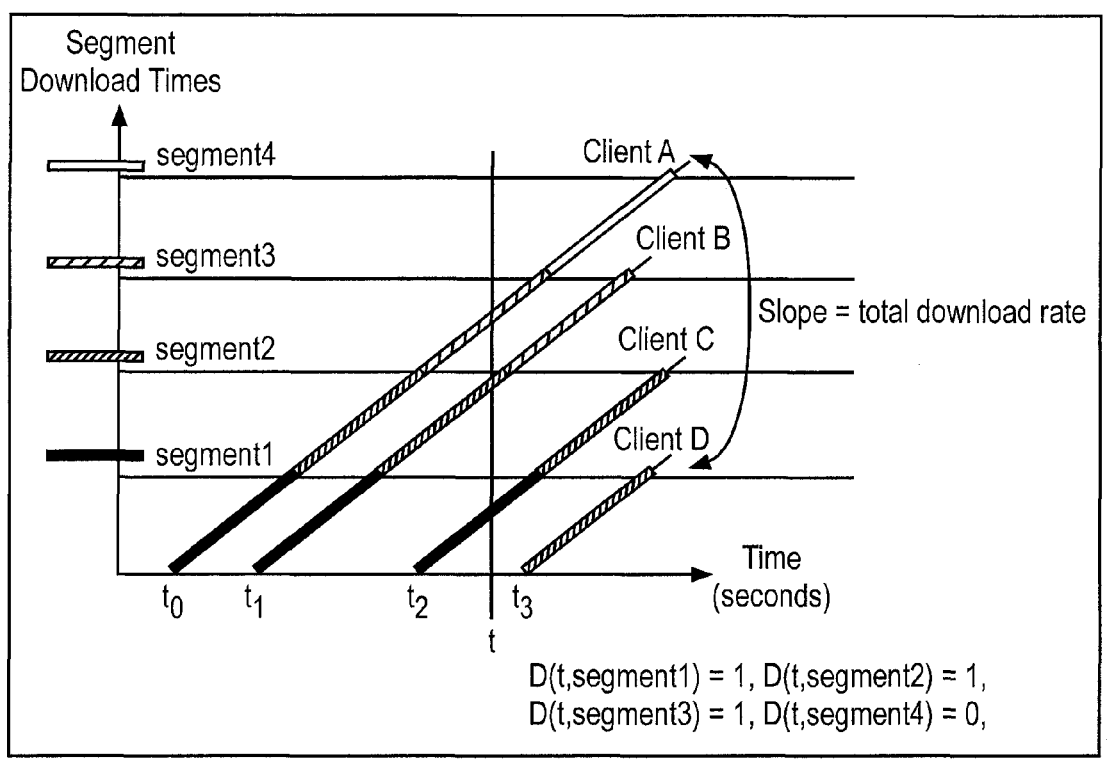
FIG. 3 illustrates a demand curve generated using the arrival time and download rates over the time.

In one embodiment, control servers track client arrivals into and departures from the streaming system, segments requested and the associated request times, supply and demand statistics for various segments, segment suppliers, supply/demand rates of clients, etc. In one embodiment, this information is used to predict the current and future supply and demand curves for each segment. In another embodiment, the predicted supply and demand curves are used to define utility functions for each media segment and depending on the value of the utility functions, control servers determine the segments to be cached at different client locations at different times. FIG. 3 illustrates an example of one estimation method. Other well known estimation models may be used and have not been included to avoid obscuring the invention.

Referring to FIG. 3, the demand curves of each client can be predicted for each segment as linear curves which start on the time-axis at the arrival time of the client and have a slope equal to the total download rate for the client. The chart in FIG. 3 depicts the situation when clients A, B, C, and D arrive at $t_0$, $t_1$, $t_2$, and $t_3$, with each of them downloading at the same total rate. At time $t_2$, when the control server tries to estimate the demand for time t, it can accurately find out which segment is demanded at what rate. If t was greater than $t_3$, it will have an inaccurate view due to the fact that client D is not yet in the picture and new arrivals occur at random.

In one embodiment, clients are assumed to depart once they downloaded the last segment of the requested media such that they are no longer available to supply a segment. Then the system predicts the request times for different segments from existing clients since the segment sizes and download rates of existing clients are known. These request time predictions are used toward estimating the future demand. The system also can estimate the departure time and update the supply curves accordingly. However, if random node departures are allowed, the request and departure times are no longer deterministic. Random client arrivals also add to the uncertainty. Hence, in another embodiment, statistical methods can be used to predict the impact of random node arrivals and node departures on the average supply and demand curves.

In one embodiment, a control server operates for each media file as follows. The notation is defined as follows:

$t_i$: Current time instant
$t_0$: Stream start time for the host
$\Delta t$: Segment duration
N: Number of segments
$\tilde{\lambda}$: Estimated user arrival rate
$\tilde{D}(t,s,t_i)$: Estimated total demanded bit rate for segment s ($1 \leq s \leq N$, $s \in Z^+$) for future time instant t ($t \geq t_i$) estimated at current time instant $t_i$.
$\tilde{S}(t,s,t_i)$: Estimated total upstream bandwidth of the peers caching segment s for future time instant t estimated at current time instant $t_i$.

The control server treats the demand as composed of a deterministic component $D_{det}$ and a stochastic component $D_{sto}$. In one embodiment, the average demand is estimated, at time $t_i$ for a discrete future time instant t such that $$\frac{(t-t_i)}{\Delta t} \in Z^+,$$

using the following formulations:

$$\tilde{D}(t, s, t_i) = D_{det}(t, s, t_i) + D_{sto}(t, s, t_i)$$

$$D_{det}(t, s, t_i) = \begin{cases} D_{det}(t - \Delta t, s - 1, t_i) & s > (t - t_i)/\Delta t \\ 0 & s \leq (t - t_i)/\Delta t \end{cases} \text{ and } t \neq t_i$$

$$D_{det}(t_i, s, t_i) = \tilde{D}(t_i, s, t_i - \Delta t) \text{ if } s > 1$$

$D_{det}(t_i, 1, t_i)$=Total demanded bit rate by new clients arriving in ($t_i - \Delta t, t_i$]

$$D_{sto}(t, s, t_i) = \begin{cases} 0 & s > (t - t_i)/\Delta t \\ \tilde{\lambda} & s \leq (t - t_i)/\Delta t \end{cases}$$

Note that in another embodiment, the stochastic portion includes one or more higher order statistics and probability functions (e.g., standard deviation, different percentiles on the empirical distribution of user arrivals, etc.) as well. In one embodiment, the demand estimates are generalized for continuous time as opposed to discrete time by tracking the arrival times of clients (peers) into the system.

Similar to the demand estimation, in one embodiment, the supply estimation is done using the formulation:

$$\tilde{S}(t,s,t_i)=S_{det}(t,s)+S_{sto}(t,s)$$

$$S_{det}(t,s)=S_{det}(t_i,s)$$

$S_{det}(t_i,s)$=total upstream bandwidth of hosts caching segment s at time instant $t_i$ $$S_{sto}(t,s)=0$$

Note that in another embodiment, the stochastic portion includes non-zero terms using the statistics of departure process, e.g., mean departure rate.

In one embodiment, the control server computes the utility function from a particular user y point of view as $$U(t,s,t_i)=I[\tilde{D}(t,s,t_i)-S(t,s,t_i)],$$

assuming that y would be supplying s at time t and the supply estimate of other users remain the same. Here I[x] refers to a function.

In one embodiment, $$I[x] = \begin{cases} x, & x > 0 \\ 0 & x \leq 0 \end{cases}.$$

In a second embodiment, $$I[x] = \begin{cases} 1, & x > 0 \\ 0 & x \leq 0 \end{cases}.$$

In a third embodiment, I[x]=x.
In a fourth embodiment, $$I[x] = \begin{cases} 0, & x \leq 0 \\ x, & R_u^y \geq x > 0 \\ R_u^y, & x > R_u^y \end{cases}$$

where $R_u^y$ is the upload rate of user y.

Other embodiments can use other arbitrary functions of the supply and demand to define utility. In different implementations, the segment sizes can be taken equal or variable across the segments of the same or different media files.

In one embodiment, the control server decides to pre-fetch a segment to a new-incoming client at the beginning of the streaming session $t_0$ by solving the optimization problem over all segments s:

$$\hat{s} = \arg\max_s \left[ \int_{t_0}^{t_0+h\Delta t} U(t, s, t_0) dt \right] \text{ for } S \in \{1, 2, \ldots, N\}$$

$\hat{s}$ can then be pre-fetched by any subset of the media servers and clients who already cache and supply $\hat{s}$. The parameter h is the optimization horizon and defines the look ahead window in the optimization problem. For an aggressive optimization, the control server sets h low, e.g., h=1 make one-step utilization maximization. For a less aggressive optimization, the control server sets h high, e.g., h=N as an extreme sets the horizon as the life-time of the user in the system. In another embodiment, the control server pre-fetches a segment to the clients already in the system by treating them as new-incoming hosts.

In another embodiment, the control server triggers a one-step caching strategy at each client at the end of the newly downloaded segment (e.g., $s_i=(t_i-t_0)/\Delta t$ is downloaded at time instant $t_i$). The decision is whether to keep the already cached segment c or to replace it with $s_i$ starting at time $t_i$. In one embodiment, the server computes $$\hat{s} = \arg\max_s \left[ \int_{t_i}^{t_i+h\Delta t} U(t, s, t_i) dt \right] \text{ for } s \in \{c, s_i\}$$

and if $\hat{s}=s_i$, then c should be replaced by $s_i$ and this information is sent as a cache trigger to client. A client starts caching at $t_i$ and supplies $s_i$ after the trigger is received. If a client has supply and demand information locally available, the same computation and decision can be performed locally as well. Unlike pre-fetching, extra bandwidth is not used for caching purposes in this embodiment.

Figure 4:
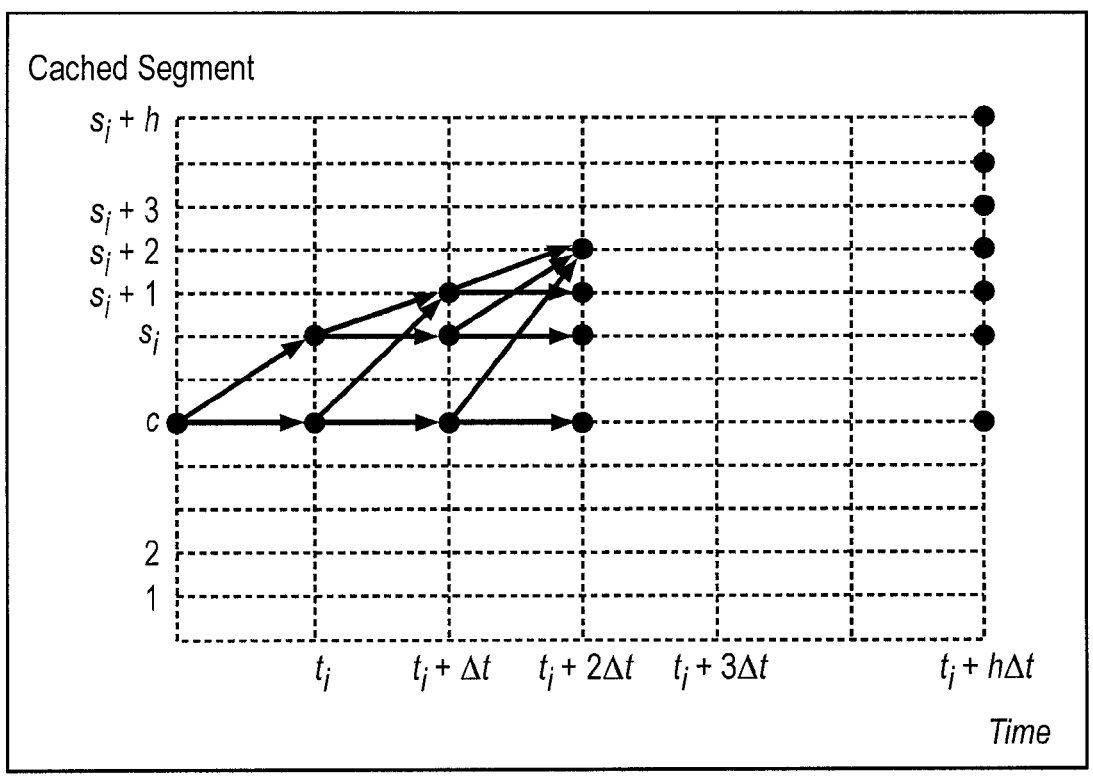
FIG. 4 illustrates a dynamic programming (or equivalently trellis) based optimization to find the best sequence of caching strategy at each client node.

In another embodiment, the control server (or the local client, if enough information is available to carry out the decision) triggers a multiple-step caching by forming a trellis graph by computing the utility value of a sequence of caching decisions where the decisions are taken at time instants that correspond to completion of downloading each new segment. FIG. 4 illustrates a dynamic programming (or equivalently trellis) based optimization used to find the best sequence of caching strategy at each client node. The cache sequence is forked into two at each decision point whether to keep the existing cache or to replace it with the just completed segment. The total utility is computed for a time horizon for every possible path except for the ones which are already dominated by other paths in terms of total utility. The number of possible paths increases with time until the time-horizon is reached. The optimization problem can be stated as follows (note that there are many equivalent versions of the problem statement and this is only one of these formulations):

At time $t_i$ (see FIG. 4), the client has segment c cached and has finished downloading segment $s_i$. To compute the cost of a sequence of decisions until time $t_i+h\Delta t$, define the path $r=\{s_{j(1)}, s_{j(2)}, \ldots, s_{j(h)}\}$, where $s_{j(m)}$ corresponds to the segment cached between time $t_i+(m-1)\Delta t$ and $t_i+m\Delta t$. At time $t_i$ there are only two choices for caching, i.e., either c or $s_i$ is selected. At time $t_i+\Delta t$, caching could occur among c, $s_i$, or $s_{i+1}$ depending on what was decided in the previous step. Following the vertices of the trellis graph, one can enumerate all the possible paths. Denote the set of all possible paths of length h as P. For each $r=\{s_{j(1)}, s_{j(2)}, \ldots, S_{j(h)}\}$ in P, in one embodiment, the path utility is defined as:

$$U_r = \sum_{m=1}^{h} \int_{t_i+(m-1)\Delta t}^{t_i+m\Delta t} U(t, s_{j(m)}, t_i) dt$$

Then the caching decision amounts to selecting the optimum path r* that maximizes $U_r$, i.e., $$r^* = \arg\max_r U_r.$$

The optimum path reveals what to cache at each step until the end of h steps. Unless the supply and demand curves change before the end of $t_i+h\Delta t$, the optimum path does not require any re-computation. In one embodiment, the optimum path is found by exhaustive search over the trellis graph. One embodiment however provides a dynamic programming based solution. In one dynamic programming based implementation, the decision amounts to the solution of following optimization problem: at time $(t_i-\Delta)$, the client has c in its cache (see FIG. 4) and it needs to decide whether to replace the already cached segment (c) with the newly downloaded segment $(s_i=(t_i-t_0)/\Delta t)$ at time instant $t_i$ and keep it until $t_i+\Delta t$ and further. The time-horizon is parameterized as h and dynamic programming is used to maximize the total utility over all paths of caching decisions with length h such that $1 \leq h \leq (N-s_i)$. Thereafter, a path utility function q(t,s,k) is computed (here s is the last segment of the path followed until discrete time t and k is the first segment of the same path) subject to the following definitions, constraints and initial conditions:

$$q(t, s, k) = \max_p [q(t-\Delta t, p, k)] + \int_{t}^{t+\Delta t} U(x, s, t_i) dx$$

$t_i + \Delta t \leq t \leq t_i + (h-1)\Delta t$, and $\frac{(t-t_i)}{\Delta t} \in Z^+$ $k \in \{c, s_i\}$ $p \in \{c, s_i+1, \ldots, s_i(t-\Delta t-t_i)/\Delta t\}$ if $s = s_i + (t-t_i)/\Delta t, k = c$, $p \in \{s_i, s_i+1, \ldots, s_i+(t-\Delta t-t_i)/\Delta t\}$ if $s = s_i + (t-t_i)/\Delta t, k = s_i$, $p \in \{s\}$ if $s_i \leq s < s_i + (t-t_i)/\Delta t$ or $s = c$.

$q(t, s, c) = -\infty$, if $(s \leq s_i$ and $s \neq c)$ or $s > s_i + (t-t_i)/\Delta t$ $q(t, s, s_i) = -\infty$, if $s < s_i$ or $s > s_i + (t-t_i)/\Delta t$ $q(t_i, c, c) = \int_{t_i}^{t_i+\Delta t} U(x, c, t_i) dx$ $q(t_i, s_i, s_i) = \int_{t_i}^{t_i+\Delta t} U(x, s_i, t_i) dx$ Then, the following computation occurs:

$$\hat{q}(k) = \max_s [q(t_i + (h-1)\Delta t, s, k)], \forall k \in \{s_i, c\}.$$

If $\hat{q}(s_i) > \hat{q}(c)$, the new segment $s_i$ replaces the earlier segment c in the cache. Else, the segment c is retained in the cache.

Note that the optimization problem discussed above is only a particular implementation of dynamic programming. Other embodiments include different versions of dynamic programming implementations. In one embodiment, the path utility functions at one time instant is used to compute the path utility functions at the following time instant for a computationally efficient implementation. This can be done by storing the costs of already computed paths and reusing them in the computation of the cost of the newly established paths. In one embodiment, when computing over a path of length h (e.g., to maximize the utility with time-horizon of h steps), the optimum path is found where each vertex of the path in the trellis graph provides the optimum decision until time $t_i+h\Delta t$. If no changes/updates in the supply and demand curves occur, the optimum path is not needed to be recomputed again until the end of time-horizon.

In a general embodiment, all or any mixture of the caching strategies aforementioned can be jointly utilized.

An Embodiment of a Control Server

Figure 6:
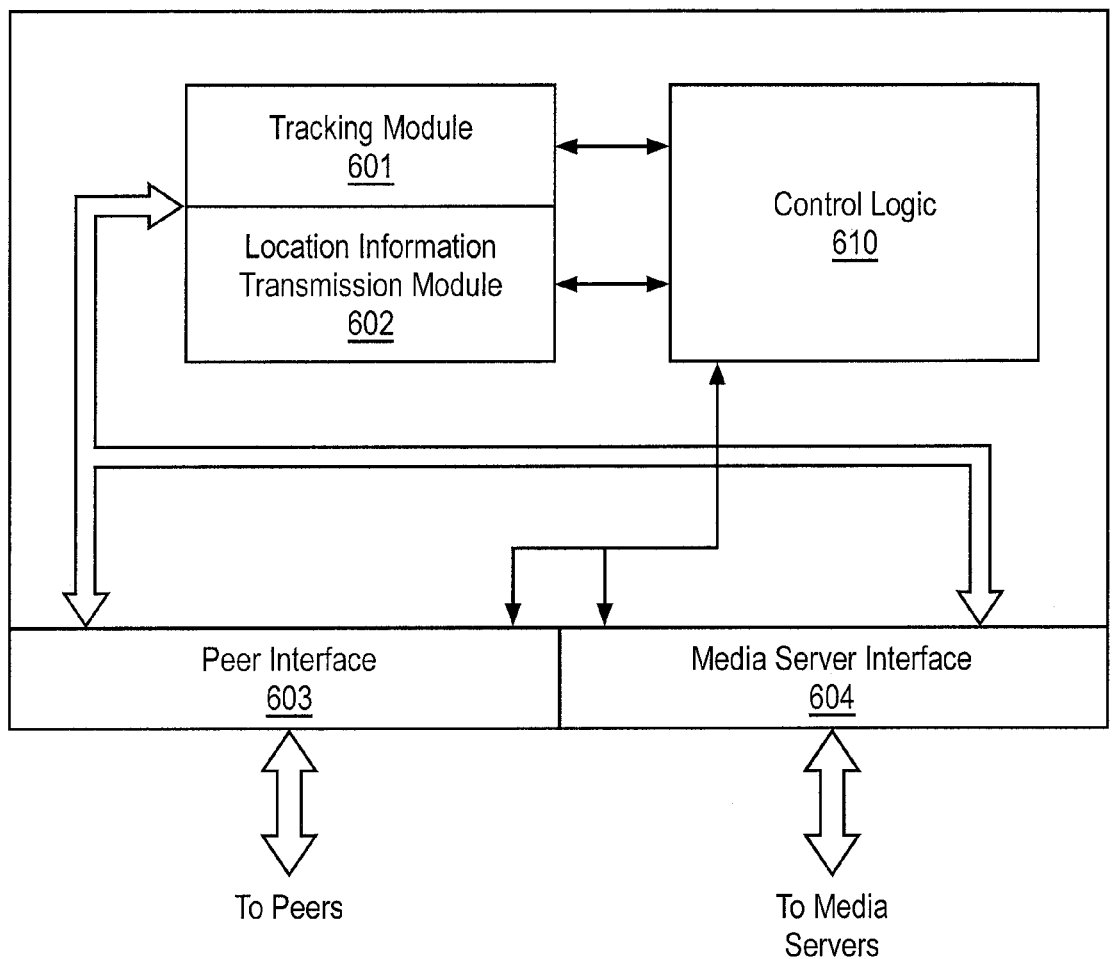
FIG. 6 is a block diagram of one embodiment of a control server.

FIG. 6 is a block diagram of one embodiment of the control server. The control server comprises processing logic that comprises hardware, software, or a combination of both. Referring to FIG. 6, the control server comprises a tracking module 601 to track media content demand and allocated resources of peers in the system to determine location information specifying locations from which each peer is to receive each segment of each media content requested by a peer. In one embodiment, tracking module 601 tracks supply and demand of each segment of media content by each peer.

In one embodiment, tracking module 601 determines the cache locations based on peer arrival rates and supply-demand analysis with respect to the peers and supply and demand of segments of media content with respect to the peers. In another embodiment, tracking module 601 determines the location information by attempting to maximize uplink bandwidth utilization at each peer by making desired segments of media content accessible at a particular time. In yet another embodiment, tracking module 601 determines whether to cache a new segment based on one or more of a group consisting of: a determined amount of reduction in load of at least one media server achieved over a period of time and a prediction of future demand of the new segment, and capability of peers and media servers to supply the new segment to other peers.

In one embodiment, tracking module 601 estimates supply and demand curves corresponding to each segment of media content at a future time and uses each estimate to determine the cache location information. In such a case, tracking module 601 estimates supply and demand curves using one or more of a group consisting of: peer arrival and departure time statistics, information indicative of when a particular media segment is requested, node inter-arrival and inter-departure statistics, information about round-trip-time communication and processing delays, media playback rate, media download rates, and media segment sizes, a utility measure computed for each media file and each segment of a media file from supply and demand curves corresponding to the supply and demand with respect to said each segment.

In one embodiment, tracking module 601 also determines how media files are segmented and determine download rates and playback delays of each segment.

The control server also comprises a location information transmission module 602 to send the location information to the peer.

The control server includes a peer interface 603 coupled to tracking module 601 and transmission module 602 to communicate with the peers. Similarly, the control server includes a media server interface 604 coupled to tracking module 601 and transmission module 602 to communicate with media servers in the system. In one embodiment, peer interface 602 and media server interface 604 are the same interface.

Control server also includes control logic 610 to control the operation of its various modules.

One Embodiment of a Computer System

Figure 5:
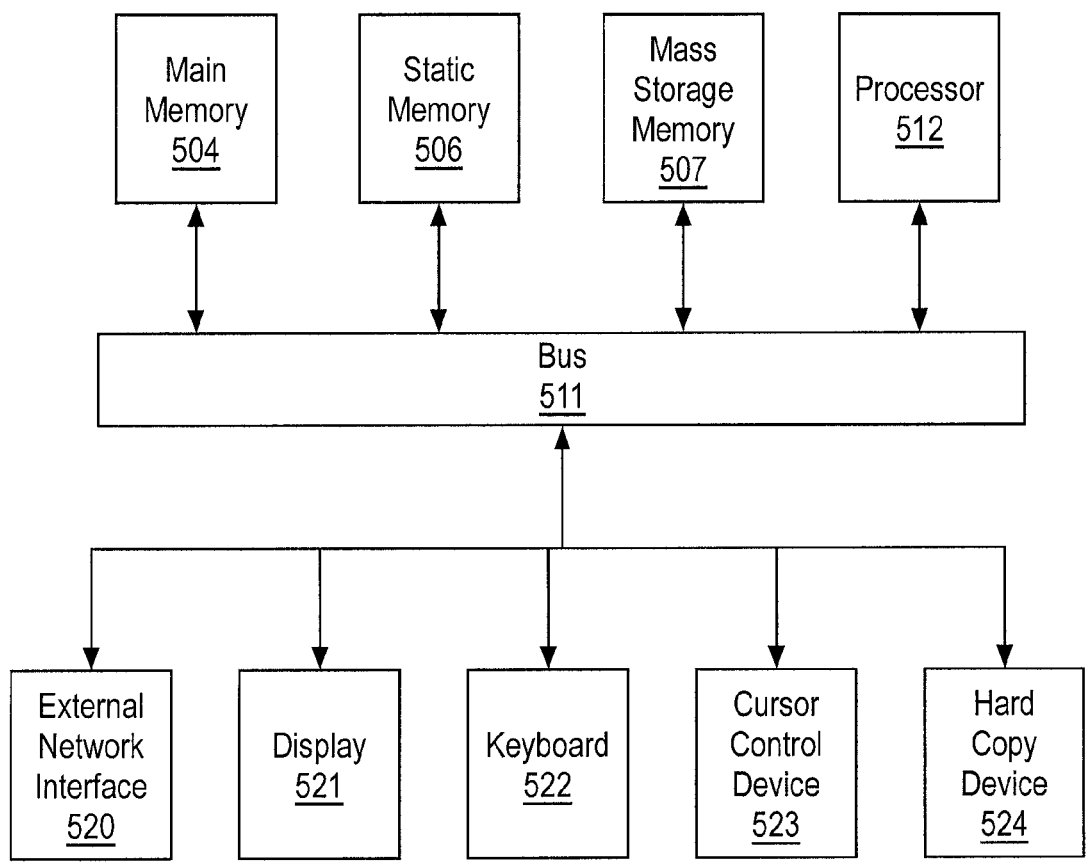
FIG. 5 is a block diagram of one embodiment of a computer system.

FIG. 5 is a block diagram of an exemplary computer system that may perform one or more of the operations described herein. Referring to FIG. 5, computer system 500 may comprise an exemplary client or server computer system. Computer system 500 comprises a communication mechanism or bus 511 for communicating information, and a processor 512 coupled with bus 511 for processing information. Processor 512 includes a microprocessor, but is not limited to a microprocessor, such as, for example, Pentium™, PowerPC™, Alpha™, etc.

System 500 further comprises a random access memory (RAM), or other dynamic storage device 504 (referred to as main memory) coupled to bus 511 for storing information and instructions to be executed by processor 512. Main memory 504 also may be used for storing temporary variables or other intermediate information during execution of instructions by processor 512.

Computer system 500 also comprises a read only memory (ROM) and/or other static storage device 506 coupled to bus 511 for storing static information and instructions for processor 512, and a data storage device 507, such as a magnetic disk or optical disk and its corresponding disk drive. Data storage device 507 is coupled to bus 511 for storing information and instructions.

Computer system 500 may further be coupled to a display device 521, such as a cathode ray tube (CRT) or liquid crystal display (LCD), coupled to bus 511 for displaying information to a computer user. An alphanumeric input device 522, including alphanumeric and other keys, may also be coupled to bus 511 for communicating information and command selections to processor 512. An additional user input device is cursor control 523, such as a mouse, trackball, trackpad, stylus, or cursor direction keys, coupled to bus 511 for communicating direction information and command selections to processor 512, and for controlling cursor movement on display 521.

Another device that may be coupled to bus 511 is hard copy device 524, which may be used for marking information on a medium such as paper, film, or similar types of media. Another device that may be coupled to bus 511 is a wired/wireless communication capability 525 to communication to a phone or handheld palm device.

Note that any or all of the components of system 500 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A system comprising:
one or more media servers to serve media content, the media content being files streamed sequentially as a set of segments;
a plurality of peers, communicably coupled to one or more other peers of the plurality of peers and at least one of the one or more media servers, to receive segments of media content, wherein at least one of the plurality of peers allocates a set of resources for serving the segments of media content including cache memory to store the segments and media files and uplink bandwidth to send the segments of media content to the one or more peers to which the one peer is communicably coupled; and
a first control server to track media content demand and the allocated resources of the plurality of peers to determine peer location information specifying the one or more locations from which each peer is to receive each segment of each media content requested, the at least one control server operable to send the location information to said each peer, wherein the first control server estimates an amount of time for a peer to consume one segment of a file and estimates when another segment of the file will be consumed,
the first control server tracks request times of each of the plurality of peers and which media segments are currently being requested to predict future demand for individual media segments,
and the first control server makes caching decisions for the plurality of peers and notifies the plurality of peers of caching decisions including determining for peers of the plurality of peers that are downloading new segments of media content whether to cache the new segments prior to completing their downloading, based on a prediction of the future demand of the new segments using current demand of an already requested portion of the media content and capability of peers and the one or more media servers to supply the new segments to other peers, and
further wherein at least one of the caching decisions is made based on a sum utility computation for a sequence of caching decisions for a time horizon in the future set by the first control server, the sum utility computation being based on the prediction of future demand and a supply estimate as a function of the sequence of caching decisions, the supply estimate being a function of current caching by peers and different caching decisions by peers at different times in the future.

2. The system defined in claim 1 wherein the first control server tracks supply and demand of each segment of media content by each peer.

3. The system defined in claim 1 wherein the first control server determines which peer location should cache which video segment using peer arrival rates and supply-demand analysis with respect to the peers and supply and demand of segments of media content with respect to the peers.

4. The system defined in claim 1 wherein the first control server determines the peer location information by attempting to maximize uplink bandwidth utilization at each peer by making desired segments of media content accessible at a particular time.

5. The system defined in claim 1 wherein the media is partitioned into contiguous segments and the first control server computes an estimated future demand for each of the segments.

6. The system defined in claim 1 wherein the first control server causes a segment of media to be streamed to one of the plurality of peers after the one peer joins the system, the one peer operable to cache the segment into its cache memory.

7. The system defined in claim 6 wherein one of both the first control server and the one peer determine whether the one peer continues to store the segment or overwrites the segment with a new segment being downloaded for playback.

8. The system defined in claim 7 wherein determining whether to cache the new segment is based on a determined amount of reduction in load of at least one of the one or more media servers achieved over a period of time.

9. The system defined in claim 1 wherein the first control server controls access to one video during time the video is available for playback in the system.

10. The system defined in claim 1 wherein each peer has a cache memory limited in size to storing a set number of segments of media.

11. The system defined in claim 1 wherein the first control server is operable to estimate supply and demand curves corresponding to each segment of media content at a future time and use each estimate to determine the location information.

12. The system defined in claim 11 wherein the first control server generates the estimate using peer arrival and departure time statistics.

13. The system defined in claim 11 wherein the first control server generates the estimate using peer arrival and departure time statistics, information indicative of when a particular media segment is requested, node inter-arrival and inter-departure statistics, information about round-trip-time communication and processing delays.

14. The system defined in claim 11 wherein the first control server generates the estimate using one or more of a group consisting of media playback rate, media download rates, and media segment sizes.

15. The system defined in claim 11 wherein the estimates are updated in regular or irregular intervals.

16. The system defined in claim 11 wherein the first control server generates the estimate based on a utility measure computed for each media file and each segment of a media file from supply and demand curves corresponding to the supply and demand with respect to said each segment.

17. The system defined in claim 16 wherein the first control server determines which segments to cache based on computed utility functions associated with each segment.

18. The system defined in claim 16 wherein the utility function is a function applied to a difference between an estimated total demanded bit rate for said each segment for a future time instance estimated at a current time instance and an estimated total upstream bandwidth of peers caching said each segment for the future time instance estimated at the current time instance.

19. The system defined in claim 1 wherein the first control server is operable to send triggers to a peer to start caching process for one or more segments of media content.

20. The system defined in claim 1 wherein the first control server is operable to determine how media files are segmented and determine download rates and playback delays of each segment.

21. The system defined in claim 1 wherein at least one peer specifies locally available resources to the first control server.

22. The system defined in claim 1 wherein one of the plurality of peers is operable to receive a trigger from the first control server to cache one or more segments of media content.

23. The system defined in claim 22 wherein the one peer pre-fetches the one or more segments in response to the trigger from the one or more media servers and one or more other peers.

24. The system defined in claim 22 wherein the one peer receives the one or more segments to be played immediately or in the future.

25. The system defined in claim 1 where the control server sends one or more control messages to at least one of a group of a media server and a peer, to cause the at least one media server or peer to push a video segment to a peer requesting the video segment.

26. A system comprising:
one or more media servers to serve media content;
a plurality of peers, communicably coupled to one or more other peers of the plurality of peers and at least one of the one or more media servers, to receive segments of media content, wherein at least one of the plurality of peers allocates a set of resources for serving the segments of media content including cache memory to store the segments and media files and uplink bandwidth to send the segments of media content to the one or more peers to which the one peer is communicably coupled; and
a first control server to track media content demand and the allocated resources of the plurality of peers to determine peer location information specifying the one or more locations from which each peer is to receive each segment of each media content requested, the at least one control server operable to send the location information to said each peer, wherein the first control server is operable to estimate supply and demand curves corresponding to each segment of media content at a future time and use each estimate to determine the location information, wherein the first control server generates the estimate based on a utility measure computed for each media file and each segment of a media file from supply and demand curves corresponding to the supply and demand with respect to said each segment,
wherein the utility function is a function applied to a difference between an estimated total demanded bit rate for said each segment for a future time instance estimated at a current time instance and an estimated total upstream bandwidth of peers caching said each segment for the future time instance estimated at the current time instance, wherein the function comprises one selected from a group consisting of:

$$I[x] = \begin{cases} x, & x > 0 \\ 0 & x \leq 0 \end{cases};$$

$$I[x] = \begin{cases} 1, & x > 0 \\ 0 & x \leq 0 \end{cases};$$

$I[x] = x$; and $$I[x] = \begin{cases} 0, & x \leq 0 \\ x, & R_u^y \geq x > 0 \\ R_u^y, & x > R_u^y \end{cases},$$

where $R_u^y$ is the upload rate of user y; and
wherein x represents the difference.

27. A method comprising:
tracking, by a control server, media content demand and allocated resources of a plurality of peers to determine location information specifying the one or more locations from which each peer is to receive each segment of each media content requested, one or more peers of the plurality of peers receiving segments of the media content and allocating resources for serving the segments of media content including cache memory to store the segments and media files and uplink bandwidth to send the segments of media content to one or more peers, the media content being files streamed sequentially as a set of segments, including
  estimating an amount of time for a peer to consume one segment of a file and when another segment of the file will be consumed,
  tracking request times of each of the plurality of peers and which media segments are currently being requested to predict future demand for individual media segments, and
  making caching decisions for the plurality of peers and notifying the plurality of peers of caching decisions, including determining for peers of the plurality of peers that are downloading new segments of media content whether to cache the new segments prior to completing their downloading, based on a prediction of the future demand of the new segments using current demand of an already requested portion of the media content and capability of peers and the one or more media servers to supply the new segments to other peers, and making at least one of the caching decisions based on a sum utility computation for a sequence of caching decisions for a time horizon in the future set by the control server, the sum utility computation being based on the prediction of future demand and a supply estimate as a function of the sequence of caching decisions, the supply estimate being a function of current caching by peers and different caching decisions by peers at different times in the future; and
sending the location information to said each peer.

28. The method defined in claim 27 further comprising tracking supply and demand of each segment of media content by each peer.

29. The method defined in claim 27 further comprising determining the which peer location to cache which video segment using peer arrival rates and supply-demand analysis with respect to the peers and supply and demand of segments of media content with respect to the peers.

30. The method defined in claim 27 further comprising determining the sending peer location information by attempting to maximize uplink bandwidth utilization at each peer by making desired segments of media content accessible at a particular time.

31. The method defined in claim 27 further comprising determining whether to cache a new segment based on one or more of a group consisting of: a determined amount of reduction in load of at least one media server achieved over a period of time and a prediction of future demand of the new segment, and capability of peers and media servers to supply the new segment to other peers.

32. The method defined in claim 27 further comprising estimating supply and demand curves corresponding to each segment of media content at a future time and using each estimate to determine the location information, wherein estimating supply and demand curves is performed using one or more of a group consisting of: peer arrival and departure time statistics, information indicative of when a particular media segment is requested, node inter-arrival and inter-departure statistics, information about round-trip-time communication and processing delays, media playback rate, media download rates, and media segment sizes, a utility measure computed for each media file and each segment of a media file from supply and demand curves corresponding to the supply and demand with respect to said each segment.

33. The method defined in claim 27 further comprising determining how media files are segmented and determine download rates and playback delays of each segment.

* * * * *